United States Patent
Eggen et al.

(10) Patent No.: US 6,299,342 B2
(45) Date of Patent: Oct. 9, 2001

(54) MIXING DEVICE

(75) Inventors: Svein Staal Eggen, Eidanger; Rune Nygaard, Stathelle, both of (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/749,501

(22) Filed: Dec. 26, 2000

Related U.S. Application Data

(63) Continuation of application No. PCT/IB99/01124, filed on Jun. 17, 1999.

(30) Foreign Application Priority Data

Jul. 1, 1998 (SE) ................................................. 9802350

(51) Int. Cl.$^7$ ................................. B29B 7/74; B01F 5/06
(52) U.S. Cl. ............................... 366/81; 366/91; 366/92; 366/285; 366/338
(58) Field of Search ................................. 366/81, 80, 79, 366/82, 91, 92, 285, 338, 336; 425/204, 205, 207, 208, 209

(56) References Cited

U.S. PATENT DOCUMENTS

| | | | |
|---|---|---|---|
| 3,392,962 | 7/1968 | Fritsch et al. | |
| 3,635,445 | * 1/1972 | Schwab et al. | 366/79 |
| 3,941,355 | * 3/1976 | Simpson | 366/336 |
| 4,299,655 | * 11/1981 | Sakaugen | 366/336 |
| 5,304,051 | * 4/1994 | Meyer | 425/208 |
| 5,409,646 | 4/1995 | Menon et al. | |
| 5,451,106 | 9/1995 | Nguyen et al. | 366/337 |
| 5,535,175 | 7/1996 | Niimi | 366/336 |
| 5,540,495 | * 7/1996 | Pickel | 366/79 |
| 5,630,968 | * 5/1997 | Wang et al. | 366/82 |
| 5,773,155 | 6/1998 | Kale et al. | |
| 5,988,866 | * 11/1999 | Barr | 366/80 |
| 6,031,027 | 2/2000 | Syre et al. | |

FOREIGN PATENT DOCUMENTS

| | | |
|---|---|---|
| 41 28 549 A1 | 3/1992 | (DE) . |
| 0 022 376 B1 | 1/1981 | (EP) . |
| 0 040 992 B1 | 12/1981 | (EP) . |
| 0 041 796 B1 | 12/1981 | (EP) . |
| 0 588 147 A1 | 3/1994 | (EP) . |
| 0 645 232 A1 | 3/1995 | (EP) . |
| 6-234170 | 8/1994 | (JP) . |
| WO 92/12182 | 7/1992 | (WO) . |

OTHER PUBLICATIONS

International Search Report for PCT/SE97/01659 dated Jan. 16, 1998.

* cited by examiner

Primary Examiner—Tony G. Soohoo
(74) Attorney, Agent, or Firm—Merchant & Gould P.C.

(57) ABSTRACT

A mixing device for compounding polymers by elongational deformation is described. The device has a casing (1) with an inlet (2) and an outlet (3). The casing has inner walls (4) defining an enclosure (5) which communicates with the inlet and the outlet. A core (6) is arranged in the enclosure and defines a mixing space (7) between the core (6) and the enclosure wall (4). The mixing space (7) is divided into several slits (9) and chambers (10) by protrusions (8). The device is characterised in that the enclosure (5) and the core (6) are concentrically arranged around a common axis (A) and are conically tapered towards the outlet (3), and that the protrusions (8) are circumferentially arranged on at least one of the core (6) and the enclosure wall (4) with a slit gap in the range from about 0.5 mm to about 10 mm and a width of the slit gap in the range of 0 to about 5 mm. Preferably, the enclosure wall (4) and the core (6) are adjustable relative to each other for adjustment of the slit gap. The mixing device is preferably incorporated in a compounding equipment comprising a melting extruder (17), the mixing device, a homogenizing extruder (18) and a pelletizer (19).

10 Claims, 3 Drawing Sheets

MIXING DEVICE

"This application is a continuation of international application number PCT/IB99/01124, filed Jun. 17, 1999, pending."

TECHNICAL FIELD

The present invention relates to a mixing device and more particular to a device for compounding, i.e. mixing and homogenisation of polymers by elongational deformation.

TECHNICAL BACKGROUND

When producing a polymer composition the ingredients thereof, such as different polymers, fillers, additives, etc, should be mixed intimately in order to obtain as homogenous a composition as possible. This intimate mixing is done by compounding the ingredients in a compounding machine, continuous or batchwise; the former type can be exemplified by an extruder which may be of the single screw of twin screw type. When the composition comprises two or more different polymers these should be so thoroughly mixed with each other that, ideally they form a completely homogenous polymer blend. To achieve this the polymers are mixed with or without external heating so that they are melted and converted into liquids and the liquid polymers are mixed at sufficiently high shear rates.

Although the conventional way of compounding polymer compositions in many instances leads to acceptable results, problems are encountered when compounding multi-modal polymer compositions, and more particularly multi-modal polymer compositions comprising a low molecular weight ethylene polymer and a high molecular weight ethylene polymer. Thus, when compounding polymer compositions, e.g. for pipes, so called "white spots" occur in the compounded material. These white spots have a size of about 10–50 µm and consist of high molecular weight polymer particles that have not been adequately compounded in the composition. In addition to being disfiguring the white spots may adversely influence the strength of the composition. Further, when compounding polymer compositions, e.g. for the production of film, gel particles with a size of about 0.01–1 mm often occur. These gel particles appear as disfiguring inhomogeneities in the finished film and consist of high molecular weight polymer particles that have not been adequately compounded in the composition.

The above described white spots and gel particles are a serious problem in the polymer industry and a solution to the problem would mean the removal of an obstacle to use otherwise superior multi-modal polymer compositions.

One has tried to solve the problem with gel particles and white spots by applying large amounts of deformation energy to the polymer composition. Normally, this is achieved by compounding the polymer composition at high shear rates and at high temperatures. However, such excessive energy input frequently results in degradation of the polymer especially when the polymer composition comprises polymer materials with large differences in viscosity. For polymer compositions comprising polymers with large differences in viscosity it has been demonstrated that mixing by applying elongational deformation is more effective and favourable than mixing by pure shear deformation.

Mixing by applying elongational deformation as in the present invention is also referred to as "dispersive mixing" as opposed to conventional "distributive mixing". While distributive mixing aims at achieving a homogenous concentration, e.g. by splitting up the stream as many times as possible, dispersive mixing aims at breaking down one phase by applying high shear or tension forces in order to obtain blending of the components of the stream. The blend thus obtained is free from visual inhomogenities (gels), but does not have to satisfy the requirement of homogenous concentration. Dispersive mixing is primarily used when the ratio between the viscosity of the two phases which are to be mixed is higher than 10:1.

As an example of a device for mixing of viscous liquids, such as polymer compositions by elongational deformation may be mentioned U.S. Pat. No. 5,451,106 to Xuan et al., the contents of which is hereby incorporated by reference. This patent discloses a mixer which has a vertical, cylindrical casing which encloses a lower die member and an adjustable, upper die member. Opposed, annular and concentric die member protrusions define alternating concentric slits and chambers. An inlet opening in the side wall of the casing allows liquid polymer to be fed into the device, through the slits and chambers between the dies where the polymer is subjected to elongational deformation, and finally the polymer exits through a central bottom outlet.

The device according to U.S. Pat. No. 5,451,106 has a number of disadvantages. Thus, arranging the inlet on the side of the casing and the outlet in the bottom of the casing results in an uneven material distribution in the device which gives problem with wear due to pressure differences in the mixing chamber. The inlet and outlet arrangement also makes it difficult to connect the mixing device to existing compounding equipment in a simple manner. Further, the geometry of the circular dies with concentric protrusions confines the number of concentric protrusions and thus the elongational deformation if the outer diameter of the device is to be kept within acceptable limits.

SUMMARY OF THE INVENTION

It is an object of the present invention to provide a mixing device which mitigates or eliminates the disadvantages of prior art devices of the type mentioned above. It is thus an object of the present invention to provide a device which gives an even material distribution and which is easy to connect to or integrate with existing compounding equipment. A further object of the present invention is to provide a device which may include a large number of alternating slits and chambers for enhanced elongational deformation without the device having an excessive outer diameter.

The above objects are achieved by providing a polymer mixing device with a casing and a core defining between them a conically tapered mixing space which is divided by circumferential protrusions into slits alternating with chambers, said protrusions being arranged on the core and/or the inner wall of the casing. Thus, the present invention provides a device for mixing and homogenisation of polymers by elongational deformation having a casing with an inlet and an outlet;
  said casing having inner walls defining an enclosure which communicates with the inlet and the outlet;
  a core arranged in the enclosure and defining a mixing space between the core and the enclosure wall;
  said mixing space being divided into several slits and chambers by protrusions;
  characterised in that the enclosure and the core are concentrically arranged around a common axis and are conically tapered towards the outlet;

and that to achieve elongational deformation the protrusions are circumferentially arranged as continous annular beads on at least one of the core and the enclosure wall with a slit gap in the range from about 0.5 mm to about 10 mm and a width of the slit gap in the range of 0 to about 5 mm.

These and other advantages and characterising features of the present invention will appear from the following specification and the appended claims.

The core or casing of the device may be static or arranged to rotate or oscillate. Thus, the core which is arranged in the enclosure of the casing may be static, i.e. non-rotatable, or rotatable by means of a motor. At present it is preferred that the core (and the casing) is static, inter alia because of the simpler structure it entails.

In order to achieve a proper elongational deformation of the polymer during the processing thereof in the mixing device according to the invention the height of the slits, i.e. the slit gap should have suitable value. This value lies within the range from about 0.5 mm to about 10 mm, more preferably from about 0.5 mm to about 5 mm, and most preferably from about 1 mm to about 3 mm. Within the indicated, preferred general range, the optimal slit gap value depends on several parameters such as the type of polymer to be processed, the polymer flow, and the overall geometry of the apparatus. To adapt the mixing device to a particular type of polymer and polymer flow the slit gap is preferably made adjustable so that a slit gap within said preferred ranges can be obtained. Such slit gap adjustment may be obtained in a number of different ways by making the core and the surrounding enclosure wall adjustable relative to each other. One suitable way is to make the core and/or the surrounding enclosure wall axially adjustable towards and away from each other. Another suitable way is to make the enclosure wall radially adjustable towards and away from the core.

The number of alternating slits and chambers, are important in that the elongational deformation or mixing of the polymer(s) usually becomes more efficient the larger the number of slits and chambers. It is also a particular advantage of the present invention that the number of protrusions, and thus the number of slits and chambers, may be enhanced compared to e.g. the device of the above mentioned U.S. Pat. No. 5 451 106. While there is no theoretical upper limit, a practical upper limit of the number of slits is about 40–50. On the other hand the number should not be too small, because this reduces the amount of elongational deformation possible to obtain. The device according to the invention should include at least one, preferably at least two slits. More preferably, the device includes about 2–20 slits, and still more preferably about 5–10 slits.

At the present invention the slit-defining protrusions may be arranged on one or both of the core and the core-surrounding enclosure wall. When the protrusions are arranged on both the core and the enclosure wall they are preferably located opposite each other so that the slits are defined between the opposed protrusions.

The slit-defining protrusions have sloping side surfaces so that the cross section of a protrusion is substantially conical or frusto-conical depending on the width of the slit gap. A protrusion with a substantially conical or frusto conical cross section may be designed in various ways. Thus it may have a pointed or rounded tip, or it may have a more or less extended, e.g. flat tip that provides the slit gap with a certain width. Also the sloping side surfaces of the protrusions may be planar or curved, e.g. convex or concave. Thus, the upstream side surface of the protrusion may be convex and the downstream side of the protrusion may be concave. The width of the slit gap lies in the range of 0 to about 5 mm, more preferably 0 to about 3 mm. The angle of the sloping side surfaces of the protrusions with a transverse plane perpendicular to the slit gap is preferably about 60°+/−15°. The height of the protrusions may vary widely, but it is preferred that the height of the protrusions is selected so that the ratio between the chamber height, i.e. the distance between the parallell chamber surfaces between the protrusions, and the slit gap lies in the range from about 5:1 to about 25:1. Further, the protrusions of the invention are arranged circumferentially on the core and/or the enclosure wall so that the protrusions form continous annular beads on the core and/or the enclosure wall.

The polymer material which is to be processed in the device of the present invention is fed to the inlet of the device in a substantially melted form. In order to bring the polymer material to a substantially melted form it is treated in a melting and feeding apparatus, such as an extruder which generates heat and pressure for melting and feeding the polymer material. Prom the extruder the substantially melted polymer material is transferred to the mixing device according to the present invention. The extruder for melting the polymer material may be a conventional type of extruder such as a single screw extruder or a twin screw extruder. The outlet of the extruder is connected to the inlet of the mixing device of the present invention to feed the polymer material from the extruder to the mixing device. As indicated above, it is presently preferred that the core of the device is static, but if it for any reason should be desired to make the core rotatable this may be obtained by connecting the core to the screw of the extruder so that the motor which drives the extruder screw also drives the core of the mixing device.

The polymer material that has been processed in the mixing device of the invention is fed through the outlet of the device for use as is or for further treatment before use. Such further treatment may comprise adding additives such as colouring agents, stabilizers, e.g. antioxidants, UV-stabilizers, etc., and homogenizing and pelletising the material. This treatment may be carried out in a conventional mixing or homogenizing apparatus such as a single screw extruder or twin screw extruder. Suitably, the polymer material is fed from the outlet of the mixing device to the inlet end of the homogenizing extruder and when leaving the extruder the homogenized polymer is pelletized in a pelletizer.

If the mixing device of the invention is to be connected both to a melting extruder and to a homogenizing extruder these extruders may be driven separately or have a common driving source. In the latter case the melting extruder, the mixing device, and the homogenizing extruder are preferably arranged along a common axis and connected so that the motor that drives the melting extruder also drives the mixing device and the homogenizing extruder.

BRIEF DESCRIPTION OF THE DRAWINGS

The invention will now be further described with reference to the accompanying drawings, in which.

DETAILED DESCRIPTION

Figure 1:
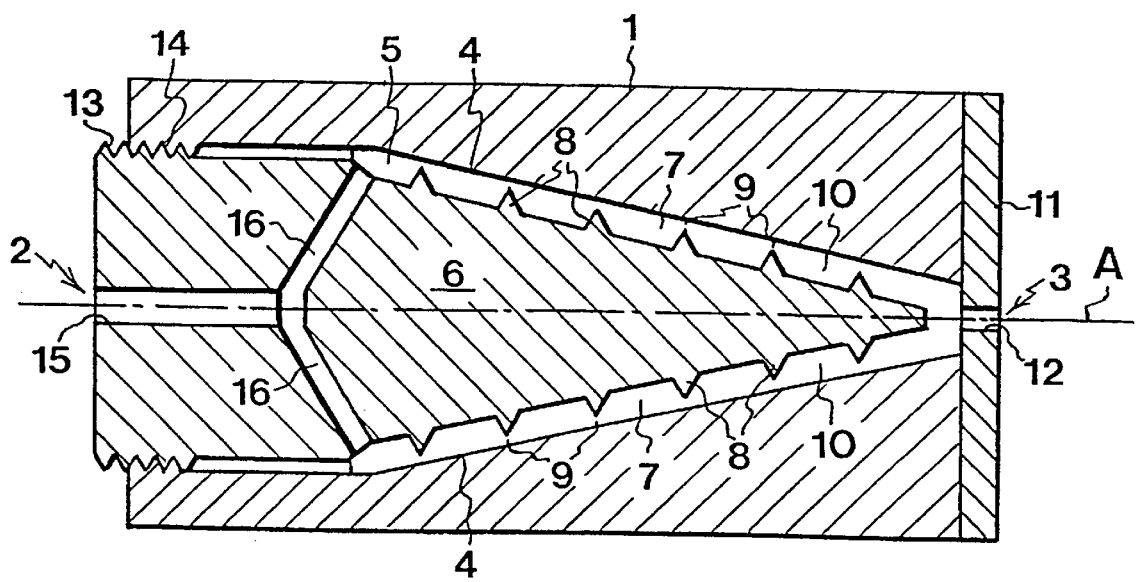
FIG. 1 is a sectional elevation of a mixing device according to the invention.
Figure 2:
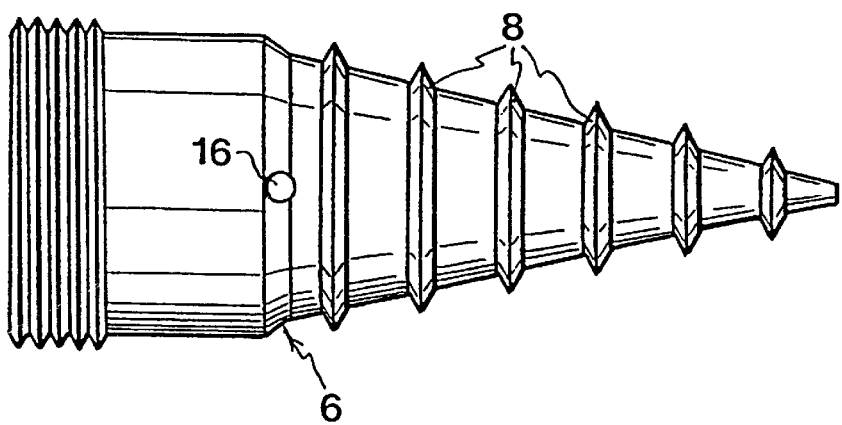
FIG. 2 is a side elevation of the core of the mixing device in FIG. 1.

As shown in FIG. 1, the mixing device of the present invention comprise a casing 1 with an inlet 2 and an outlet 3. The inner walls 4 of the casing define an enclosure 5 which communicates with the inlet 2 and the outlet 3. Within the enclosure 5 a core 6 is arranged. Both the enclosure 5 and the core 6 are conically tapered towards the outlet 3 and the core 6 and the enclosure 5 are concentrically arranged around a common axis A. The dimensions of the core 6 are somewhat smaller than those of the enclosure 5 so that between the core and the enclosure a mixing space 7 is defined. As shown i FIGS. 1 and 2 the core 6 on its surface has circumferential protrusions or beads 8. These protrusions 8 divide the mixing space into several slits 9 and chambers 10. In the embodiment of FIGS. 1 and 2 only the core 6 is provided with protrusions 8, but as mentioned earlier it is within the scope of the invention to provide one or both of the core 6 and the enclosure wall 4 with protrusions 8. If both the core 6 and the enclosure wall 4 are provided with protrusions 8, these protrusions are preferably arranged opposite each other so that the tips of the protrusions define slits and the areas between the protrusions define chambers. Although less preferred, it is also possible to arrange the protrusions in a staggered manner, i.e. the protrusions on the core are arranged between the protrusions of the enclosure wall.

As shown in FIG. 1, the casing 1 at its outlet end is provided with a die plate 11 with a die opening 12 through which the mixed polymer material is fed. To mount the core 6 inside the casing 1 and adjust the slit gap, i.e. the distance between the tip of a protrusion 8 and the opposing enclosure wall 4, to a suitable value, the core and the enclosure wall are movable relative each other, and more particularly the core is threaded in the casing by means of helical threads 13, 14 on the core and the enclosure wall, respectively.

At the inlet side of the mixing device the core has an inlet opening 15 for feeding polymer material to be processed in the mixing device. The inlet opening 15 communicates with the mixing space 7 via four feeding channels 16, two of which are shown in FIG. 1.

In the embodiment shown in FIGS. 1 and 2 the core 6 is static, i.e. it is not rotatable. It is within the scope of the invention, however, for the core to be rotatable. This may be achieved by mounting the core on a shaft (not shown) that is coextensive with the axis A and substituting a bearing (not shown) for the threading 13, 14. This bearing should be of a type that allows for relative axial movement between the core and the casing so that the slit gap can be adjusted. Alternatively, the slit gap adjustment may be obtained by making the enclosure wall of the casing radially movable towards and away from the core (not shown in FIG. 1).

Figure 3:
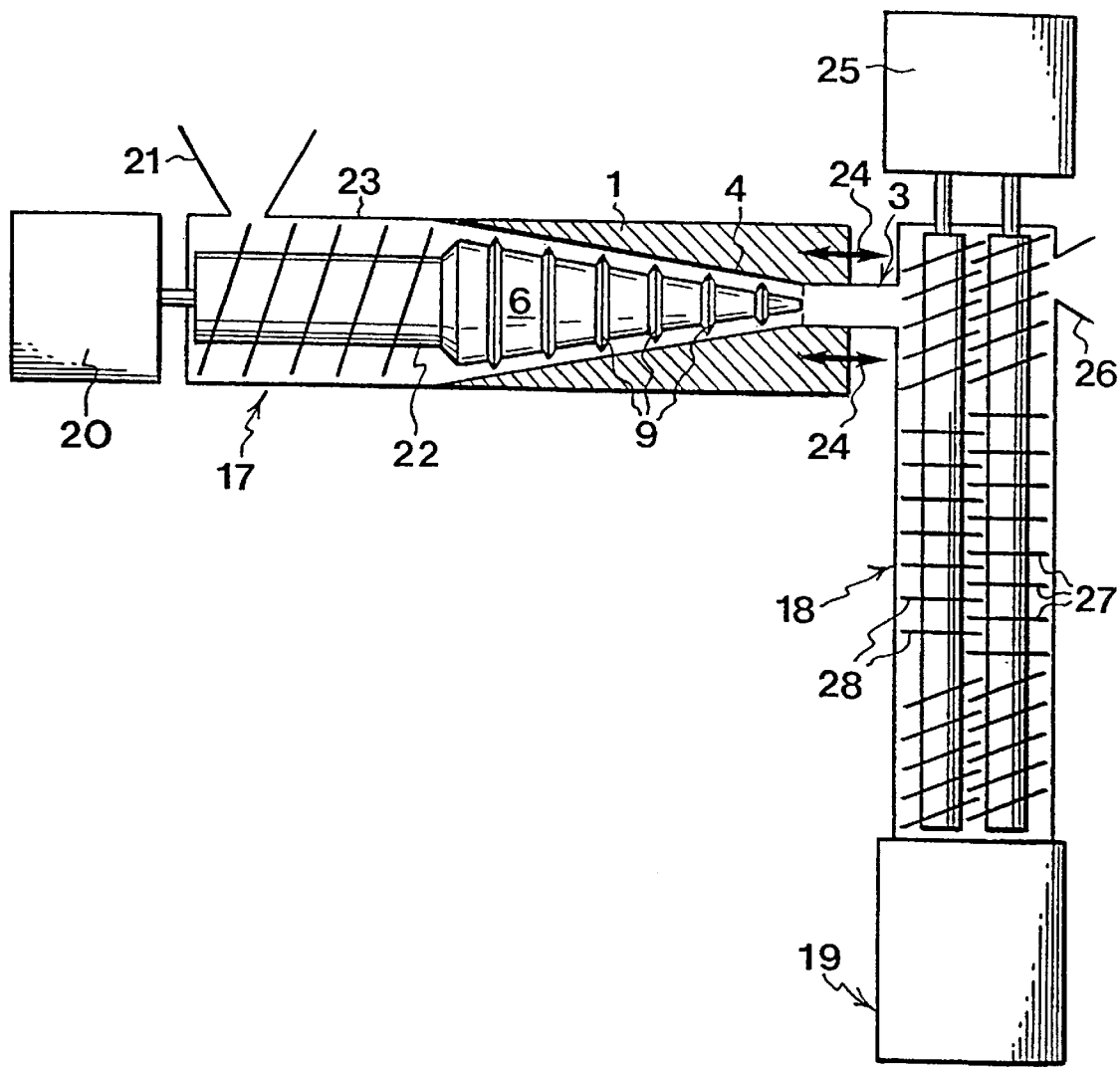
FIG. 3 is a schematic view of an arrangement including a melting extruder, a mixing device according to the invention, a homogenizing extruder, and a pelletizer.

As shown schematically in FIG. 3, the mixing device of the invention is preferably part of a compounding equipment comprising a melting extruder, a homogenizing extruder 18, and a pelletizer 19. The extruder 17 may be a single or twin screw extruder provided with a motor 20 for driving the screw(s) and a hopper 21 for feeding polymer material to be compounded. The melting extruder 17 may be of a type known to the skilled person and there is therefore no need to describe the extruder 17 in further detail. The mixing device of the invention is connected to the outlet side of the melting extruder 17 for receiving substantially melted polymer material from the extruder 17. The mixing device may be separately attached to a conventional melting extruder or may be designed as an integral part of the melting extruder. In the lastmentioned case the core 6 may be rotatable and mounted on an extension of the extruder screw 22 as schematically indicated in FIG. 3. The casing 1 of the mixing device may likewise form an extension of the extruder barrel 23 and may be provided with temperature control means (not shown) such as channels for circulating a heat exchange fluid. In order to adjust the slit gaps 9 the enclosure wall 4 of the casing 1 may be axially movable as indicated by the arrows 24. The polymer material is discharged from the mixing device through the outlet 3 and fed into the subsequent homogenizing extruder 18. This homogenizing extruder which is of a type known to the skilled person is schematically shown in FIG. 3 as a twin screw extruder driven by a motor 25. Through a hopper 26 various additives such as colouring agents, etc. may be added. The polymer material and the additives are then homogenized through dispersive and distributive mixing by the twin screws 27, 28 of the extruder 18 as schematically indicated in FIG. 3. The homogenized polymer material is then discharged to the pelletizer 19 which forms the polymer material into pellets.

Another, less preferred alternative for arranging the compounding equipment of FIG. 3 is to align the melting extruder 17, the mixing device, the homogenizing extruder 18, and the pelletizer, and drive all of them with one common motor.

Figure 4:
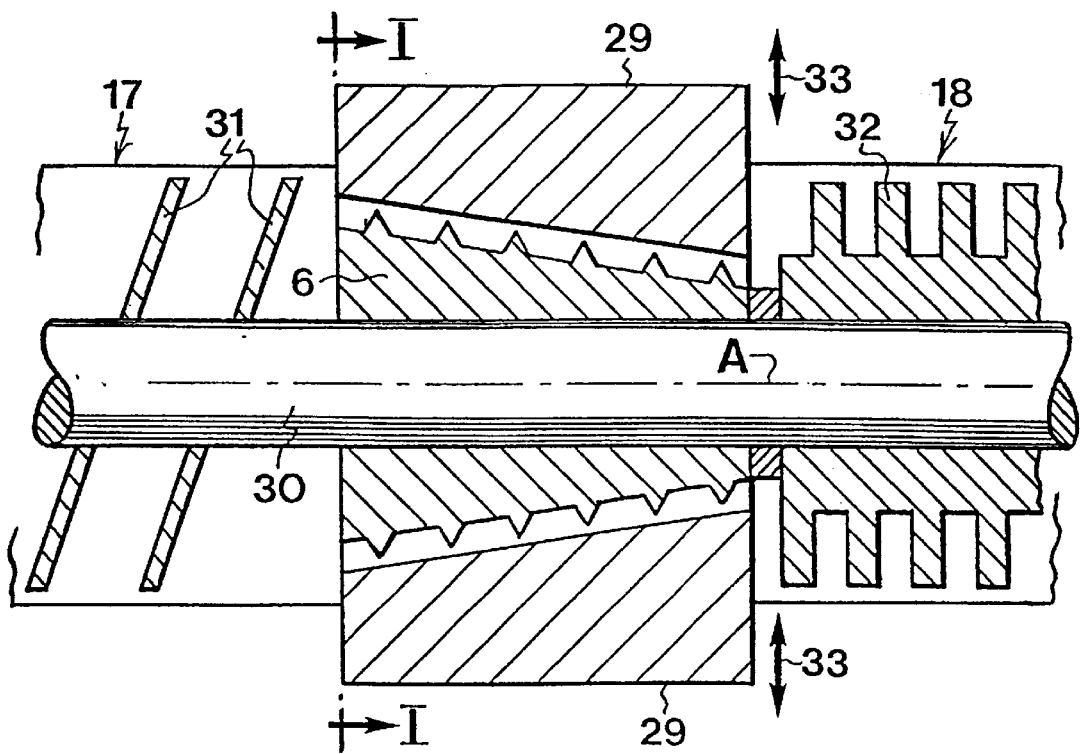
FIG. 4 is a schematic sectional elevation of an embodiment including a double core device provided with a gate valve and connected to double screw melting and homogenizing extruders, repectively.
Figure 5:
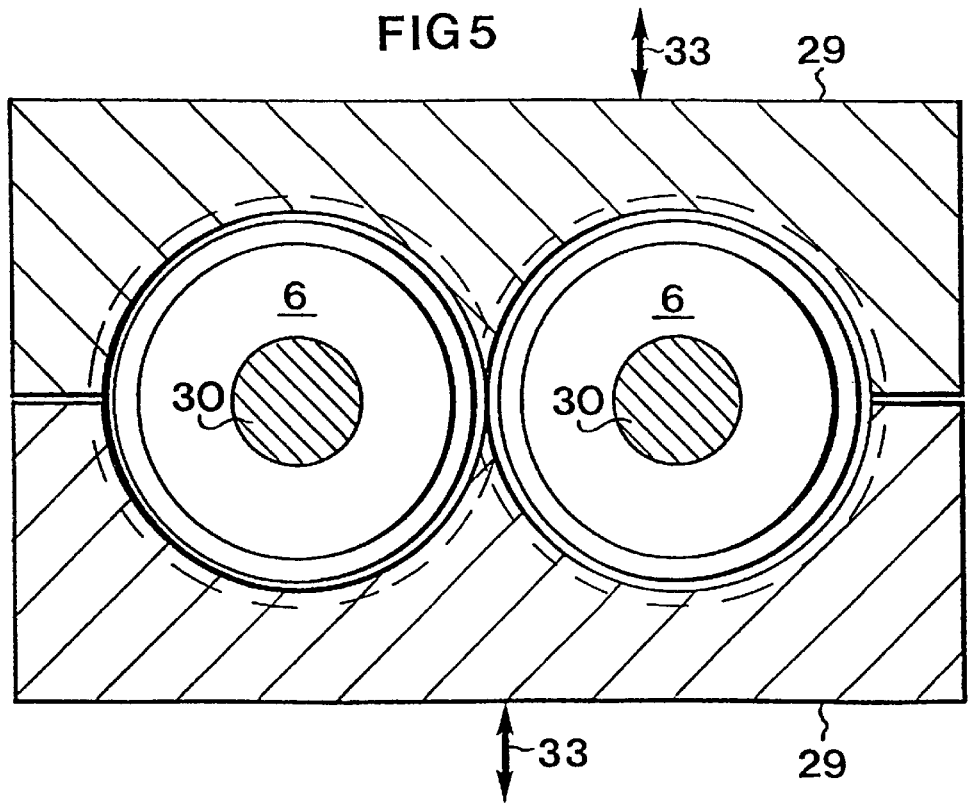
FIG. 5 is a section along the line I—I in FIG. 4.

FIGS. 4 and 5 schematically show an embodiment with a twin screw melting extruder 17, a double core mixing device with radially adjustable enclosure walls 29, and a twin screw homogenizing extruder 18 aligned with each other and mounted on a common shaft 30 driven by a common motor (not shown). In this emodiment the polymer material is at least substantially melted in the extruder 17 and fed by its screw threads 31 to the mixing device where the polymer material is subjected to elongational deformation for the elimination of gels and "white spots". From the mixing device the polymer material is discharged to the homogenizing extruder 18 where the polymer material is homogenized by the screws 32 of the twin screw extruder 18 similar to what has been described in connection with FIG. 3.

As is indicated by arrows 33 in FIGS. 4 and 5, the enclosure wall portions 29 of the casing are movable radially like a gate valve for slit gap adjustment by means not shown. Instead of having two mixing devices arranged side by side, as indicated in FIGS. 4 and 5, it is also possible to arrange two or more mixing devices in series, after one another.

The mixing device of the present invention has been described above with reference to certain preferred embodiments, but it is to be understood that the invention is not limited thereto and that various modifications may be made within the scope of the invention as defined by the accompanying claims. The device of the present invention affords a simple and compact means for mixing polymer materials and in particular for mixing bimodal or multimodal polymers and eliminate gels and "white spots" therefrom by subjecting the polymer material to elongational deformation. The mixing device of the invention is particularly advantageous in that it allows for a large number of elongational deformation generating slits and chambers in a small volume, i.e. the device is very compact, and further it is easy to connect the device to existing compounding equipment such as extruders or to integrate it with newly designed compounding equipment.

What is claimed is:

1. A device for mixing and homogenisation of polymers by elongational deformation having a casing (1) with an inlet (2) and an outlet (3);

said casing having inner walls (4) defining an enclosure (5) which communicates with the inlet and the outlet;

a core (6) arranged in the enclosure and defining a mixing space (7) between the core (6) and the enclosure wall (4);

said mixing space being divided into several slits (9) and chambers (10) by protrusions (8); characterised in that the enclosure (5) and the core (6) are concentrically arranged around a common axis (A) and are conically tapered towards the outlet (3);

and that to achieve elongational deformation the protrusions (8) are circumferentially arranged as continous annular beads on at least one of the core (6) and the enclosure wall (4) with a slit gap in the range from about 0.5 mm to about 10 mm and a width of the slit gap in the range of 0 to about 5 mm.

2. A device according to claim 1, wherein the core (6) is static.

3. A device according to claim 1, wherein the enclosure wall (4) and the core (6) are adjustable relative to each other for adjustment of the slit gap (9).

4. A device according to claim 3, wherein the core (6) is axially adjustable towards and away from the enclosure wall (4).

5. A device according to claim 3, wherein the enclosure wall (4) is axially adjustable towards and away from the core (6).

6. A device according to claim 3, wherein the enclosure wall (4) is radially adjustable towards and away from the core (6).

7. A device according to claim 1, wherein the mixing space (7) has 2–20 slits (9).

8. A device according to claim 1, wherein the inlet (2) of the device is connected to the outlet of a melting extruder (17).

9. A device according to claim 8, wherein the melting extruder (17), the inlet (2), the core (6), and the outlet (3) of the device have a common axis (A).

10. A device according to claim 1, wherein the outlet (3) of the device is connected to a homogenizing extruder (18).

* * * * *